(12) United States Patent
La Rotonda et al.

(10) Patent No.: US 8,584,258 B2
(45) Date of Patent: Nov. 12, 2013

(54) CONTROL FOR INVITING AN UNAUTHENTICATED USER TO GAIN ACCESS TO DISPLAY OF CONTENT THAT IS OTHERWISE ACCESSIBLE WITH AN AUTHENTICATION MECHANISM

(75) Inventors: Michael La Rotonda, Oakland, CA (US); Neal Sample, Santa Cruz, CA (US); F. Randall Farmer, Palo Alto, CA (US); Paul Brody, Palo Alto, CA (US); Ellen Sue Perelman, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1348 days.

(21) Appl. No.: 11/314,206

(22) Filed: Dec. 20, 2005

(65) Prior Publication Data
US 2006/0184997 A1    Aug. 17, 2006

Related U.S. Application Data

(63) Continuation-in-part of application No. 10/832,172, filed on Apr. 26, 2004, now Pat. No. 7,269,590.

(60) Provisional application No. 60/540,505, filed on Jan. 29, 2004, provisional application No. 60/544,639, filed on Feb. 13, 2004.

(51) Int. Cl.
| | |
|---|---|
| *G06F 15/16* | (2006.01) |
| *G06F 7/04* | (2006.01) |
| *G06F 21/00* | (2013.01) |

(52) U.S. Cl.
USPC ............. 726/28; 726/5; 713/151; 713/168; 713/182; 713/186; 709/203; 709/217; 709/223; 709/229

(58) Field of Classification Search
USPC ............................................. 726/28
See application file for complete search history.

(56) References Cited

U.S. PATENT DOCUMENTS

| | | |
|---|---|---|
| 6,539,232 B2 | 3/2003 | Hendrey et al. |
| 6,542,748 B2 | 4/2003 | Hendrey et al. |

(Continued)

OTHER PUBLICATIONS

Furht, B., 'Handbook of Social Network Technologies and Applications', Springer Science+Business Media, LLC, 2010, Chapter 22, http://hbanaszak.mjr.uw.edu.pl/TempTxt/ebooksclub.org_Handbook_of_Social_Network_Technologies_and_Applications.pdf.*

(Continued)

*Primary Examiner* — Edan Orgad
*Assistant Examiner* — Ronald Baum
(74) *Attorney, Agent, or Firm* — James J. DeCarlo; Greenberg Traurig, LLP

(57) ABSTRACT

Enabling an unauthenticated user to access content associated with an authenticated user as though the unauthenticated user had a selected user relationship with the authenticated user. The user relationship may comprise a relationship degree, a relationship category, a relationship rating, and/or the like. An invitation to join an electronic service, such as an online social network, is sent to the unauthenticated user at an address known to the authenticated user. The invitation includes a time-limited token, such as a URL, that includes an invitation identifier, which relates the invitation to the authenticated user content. The token may be encrypted in the invitation. The unauthenticated user returns the token as a request to preview the authenticated user content without first becoming an authenticated user of the electronic service. If the token is still valid, access is granted. The unauthenticated user may also request to establish a connection with the authenticated user.

17 Claims, 7 Drawing Sheets

(56) References Cited

U.S. PATENT DOCUMENTS

| | | | |
|---|---|---|---|
| 6,542,749 B2 | 4/2003 | Tanaka et al. | |
| 6,542,750 B2 | 4/2003 | Hendrey et al. | |
| 6,647,269 B2 | 11/2003 | Hendrey et al. | |
| 6,681,247 B1 | 1/2004 | Payton | |
| 6,819,919 B1 | 11/2004 | Tanaka | |
| 7,089,208 B1* | 8/2006 | Levchin et al. | 705/39 |
| 7,143,052 B2 | 11/2006 | LaSalle et al. | |
| 7,200,638 B2 | 4/2007 | Lake | |
| 7,289,971 B1* | 10/2007 | O'Neil et al. | 705/44 |
| 7,290,285 B2* | 10/2007 | McCurdy et al. | 726/27 |
| 7,366,759 B2 | 4/2008 | Trevithick et al. | |
| 7,536,637 B1 | 5/2009 | Nauerz et al. | |
| 7,558,759 B2* | 7/2009 | Valenzuela et al. | 705/50 |
| 7,613,769 B1 | 11/2009 | Hess | |
| 7,813,741 B2 | 10/2010 | Hendrey et al. | |
| 7,890,581 B2* | 2/2011 | Rao et al. | 709/204 |
| 8,135,749 B2* | 3/2012 | Deguchi et al. | 707/791 |
| 8,171,556 B2* | 5/2012 | Torigai et al. | 726/26 |
| 2001/0032245 A1 | 10/2001 | Fodor | |
| 2002/0023059 A1* | 2/2002 | Bari et al. | 705/76 |
| 2002/0040310 A1* | 4/2002 | Lieben et al. | 705/7 |
| 2003/0037114 A1 | 2/2003 | Nishio et al. | |
| 2004/0103203 A1* | 5/2004 | Nichols et al. | 709/229 |
| 2004/0122855 A1 | 6/2004 | Ruvolo et al. | |
| 2004/0133440 A1* | 7/2004 | Carolan et al. | 705/1 |
| 2004/0255137 A1* | 12/2004 | Ying | 713/193 |
| 2005/0015432 A1 | 1/2005 | Cohen | |
| 2005/0125408 A1 | 6/2005 | Somaroo et al. | |
| 2005/0209861 A1 | 9/2005 | Hewes et al. | |
| 2005/0216300 A1 | 9/2005 | Appelman et al. | |
| 2006/0021009 A1 | 1/2006 | Lunt | |
| 2007/0121843 A1* | 5/2007 | Atazky et al. | 379/114.13 |
| 2008/0133716 A1* | 6/2008 | Rao et al. | 709/220 |
| 2009/0193494 A1* | 7/2009 | Ratliff et al. | 726/1 |

OTHER PUBLICATIONS

Office Communication for U.S. Appl. No. 10/863,926, mailed on May 14, 2009.
U.S. Patent and Trademark Office, Office Communication mailed Sep. 29, 2009 for U.S. Appl. No. 10/863,926, 16 pages.
U.S. Patent and Trademark Office, Office Communication mailed Sep. 2, 2009 for U.S. Appl. No. 10/866,954, 36 pages.
Office Communication for U.S. Appl. No. 10/946,630, mailed Oct. 26, 2009.
Office Communication for U.S. Appl. No. 11/392,247, mailed Nov. 23, 2009 (23 pages).
U.S. Appl. No. 10/946,630, Official Communication mailed May 28, 2008.
U.S. Appl. No. 10/863,926, Official Communication mailed Apr. 16, 2008.
U.S. Appl. No. 10/863,926, Official Communication mailed Aug. 1, 2008.
U.S. Appl. No. 10/863,926, Official Communication mailed Apr. 1, 2009.
U.S. Appl. No. 11/392,247, Official Communication mailed Jan. 21, 2009.
PCT Preliminary Report on Patentability for Application No. PCT/US2004/038707 mailed Aug. 10, 2006.
PCT Preliminary Report on Patentability for Application No. PCT/US2004/038705 mailed Oct. 26, 2006.
"Design Center Tutorial: Preview and Test Dynamic Pages on a Testing Server," Adobe.com, 6 pages, http://www.adobe.com/designcenteadreamweaver/articles/drw8at_testserver.html (accessed Sep. 2, 2008).
U.S. Appl. No. 10/946,630, Official Communication mailed Jun. 12, 2009.
U.S. Patent and Trademark Office Communication dated Dec. 8, 2008 for corresponding U.S. Appl. No. 11/314,201, filed Dec. 20, 2005 (33 pages).

* cited by examiner

CONTROL FOR INVITING AN UNAUTHENTICATED USER TO GAIN ACCESS TO DISPLAY OF CONTENT THAT IS OTHERWISE ACCESSIBLE WITH AN AUTHENTICATION MECHANISM

CROSS-REFERENCE TO RELATED APPLICATIONS

This application claims the benefit of U.S. Utility application Ser. No. 10/832,172 filed on Apr. 26, 2004, the benefit of the earlier filing date of which is hereby claimed under 35 U.S.C. §120 and which is further hereby incorporated by reference.

FIELD OF ART

The present invention relates generally to computing software for managing display of content, and more particularly to a method and system for enabling an unauthenticated user to view selected content based on a token from an authenticated user.

BACKGROUND

Many computing systems enable a user to control access to information through passwords, encryption keys, presence settings, and/or other methods. Some online systems enable a user to enter information about the user and enable the user to control whether, how, or which information is accessible to other users. For example, some online systems enable a user to enter a profile of information and establish a group of contacts. Such systems may enable only those contacts to access the profile information and/or detect whether the user is currently logged into an online service, such as a messaging service, a job placement service, or other topic-specific service. The set of contacts comprise a network of people who know a user well enough to provide their contact information. This is sometimes considered a single-level social network.

More broadly, a social network typically comprises a person's set of direct and indirect personal relationships. Direct personal relationships usually include relationships with family members, friends, colleagues, coworkers, and other people with which the person has had some form of direct contact, such as contact in person, by telephone, by email, by instant message, by letter, and the like. These direct personal relationships are sometimes referred to as first degree relationships. First degree relationships can have varying degrees of closeness, trust, and other characteristics. These relationships can also be unidirectional or bidirectional. A unidirectional relationship typically means that a first person is willing and able to interact with a second person, but the second person is not willing or able to interact with the first person. Conversely, a bidirectional relationship typically means that both people are willing and able to interact with each other.

Indirect personal relationships typically include relationships through first degree relationships to other people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as a second degree relationship.

Online social network services have developed based on specific topics, such as job placement and dating. These online social network services enable users to connect with each other if they did not previously know each other, but may share a common interest. After a connection is made, the users may view information about each other and/or send messages to each other, but there is little else for the users to do through the online network service. These online network services also generally require a new user to subscribe to the service before the new user has access to any information about other users, even information about an existing user that invites the new user to join the online service.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF EMBODIMENTS

Figure 1:
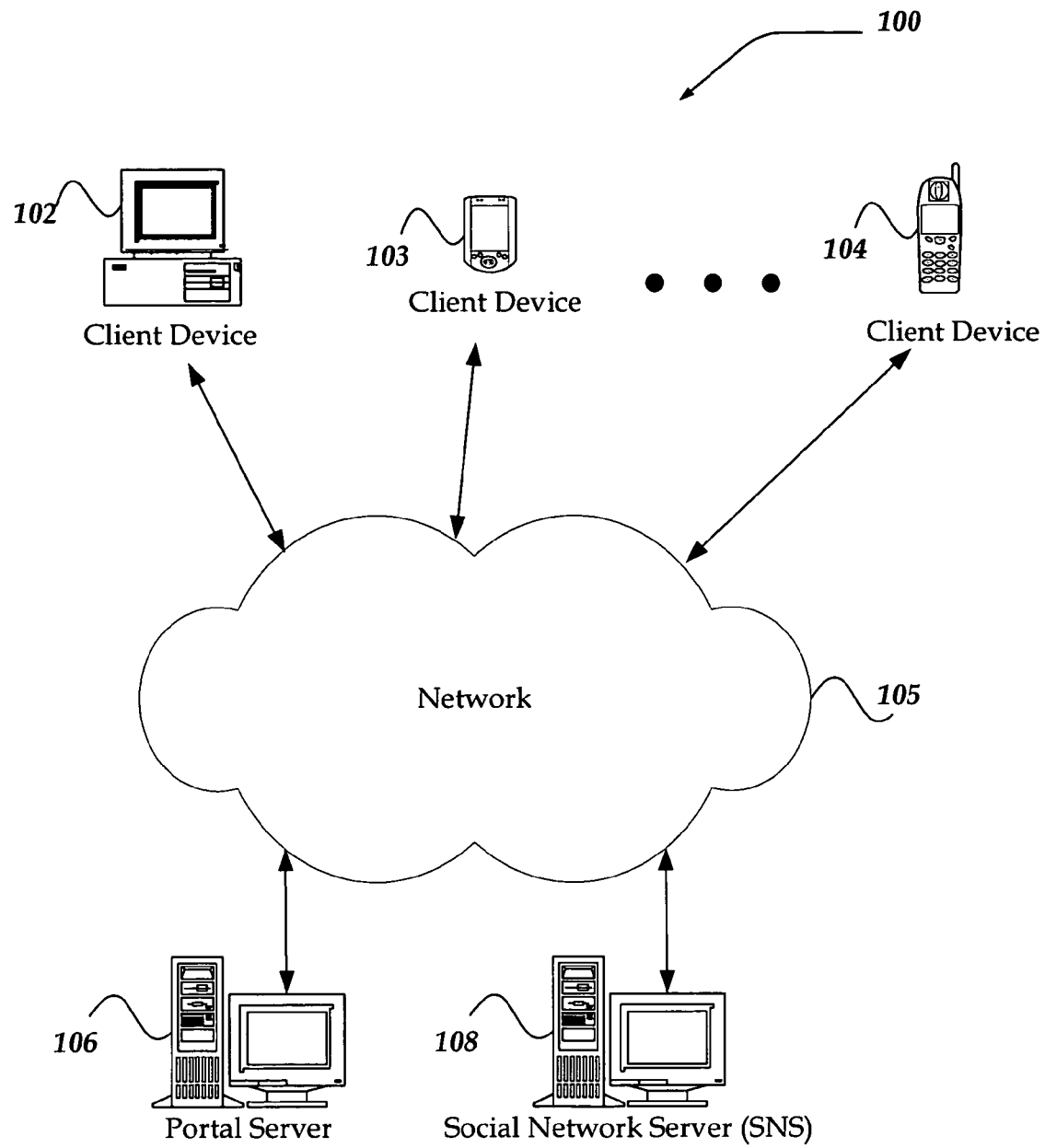
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements. The meaning of "a," "an," and "the" include plural references. The meaning of "in" includes "in" and "on." Additionally, a reference to the singular includes a reference to the plural unless otherwise stated or is inconsistent with the disclosure herein. The term "or" is an inclusive "or" operator, and includes the term "and/or," unless the context clearly dictates otherwise. The phrase "in one embodiment," as used herein does not necessarily refer to the same embodiment, although it may. Similarly, the phrase "in another embodiment," as used herein does not necessarily refer to a different embodiment, although it may. The term "based on" is not exclusive and provides for being based on additional factors not described, unless the context clearly dictates otherwise. The term "user" can include a computer user, an online service subscriber, an online social network user and/or other person using an electronic device.

The term "social network" can include a group of people with which a user has direct and/or indirect relationships, as well as a service for communicating information to and/or from any of the people with which a user has direct and/or indirect relationships. However, an indirect relationship can also be through a shared interest, without any degree of personal relationship between intermediate people. For example, a set of complete strangers can comprise a social network on the basis of a common interest in a topic or an activity, such as fishing. Thus, the term social network includes a group of people associated by a common interest and/or a service for communicating information to and/or from any of the people with which a user has an interest relationship.

Embodiments of the present invention provide many capabilities to utilize social networks and/or other networks. Personal relationships and/or interest relationships can be utilized to find and develop relevant connections for a variety of activities, such as job networking, service referrals, dating, and the like. Finding and developing relevant connections can be accelerated with online services. However, potential new users may be reluctant to join an online service and/or to respond to a request to participate with another member of the online service not known to the user. An invitation from a known contact may help an invitee feel more comfortable about joining the service. However, even an invitee may be reluctant to join before seeing a sample of the service. Trust can be built faster if information is not just a sample, but information that the invitee may access if the invitee joins the service.

To build trust quickly, information about an inviter can be provided to the invitee. For example, the invitee may be allowed to temporarily access content from the inviter's personal web page. The content may include the inviter's web log, a collection of photos, a list of recommended restaurants, and/or other content relevant to the inviter. The inviter can control which portions of content are accessible to the invitee. For example, if the inviter is inviting a former classmate, the inviter may limit the content to that which is accessible to the inviter's registered classmates. Many other types of information can be provided based on inviter selections. Embodiments of the present invention enable members to control information access, yet speed the process of building trust, and generally to enhance experiences relating to an online social network and/or other networks.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, an optional portal server 106, and a social network server (SNS) 108. Network 105 is in communication with and enables communication between each of client devices 102-104, portal server 106, and SNS 108.

Client devices 102-104 may include virtually any computing device capable of receiving and sending a message over a network, such as network 105, to and from another computing device, such as SNS 108, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a wireless application protocol (WAP), a Handheld Device Markup Language (HDML), such as Wireless Markup Language (WML), WMLScript, JavaScript, and the like.

Client devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

Client devices 102-104 may be further configured to enable a user to manage a user profile, degrees of relationships, categories of relationships, activity participation, and the like, which may in turn be saved at a remote location, such as SNS 108, and the like. As such, client devices 102-104 may further include a client application that is configured to manage various actions on behalf of the client device. For example, the client application may enable a user to interact with the browser application, email application, and the like, to customize how another social network user might view a persona, profile, or the like associated with the user. For example, the user may employ the client application, in part, to provide one customized view for family members, another customized view for poker members, yet another view for fishing buddies, and the like. The client application may interact with a process such as described below to customize and manage such views, and enable unauthenticated users to preview portions of content.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between client devices 102-104, portal server 106, and/or SNS 108.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Portal server 106 and SNS 108 may comprise multiple computing devices or a single computing device. Portal server 106 may provide online services such as messaging, search, news, shopping, advertising, and/or the like. SNS 108 may provide similar service and/or other services that also enable users to centralize the sharing of information and viewing of information regarding other users and themselves. For example, users may have a personal web site to share and view online journals (e.g., blogs), photos, reviews, and the like. For exemplary purposes, the operations of portal server 106 and SNS 108 are described together, and generally refer to SNS 108. Briefly, SNS 108 may include any computing device capable of connecting to network 105 and may manage customization of views associated with a social network user, such as a user of at least one of client devices 102-104. Devices that may operate as SNS 108 include dedicated servers, personal computers, desktop computers, multiprocessor systems, microprocessor-based or programmable consumer electronics, network PCs, and the like.

SNS 108 may be configured to receive information associated with a client user and to enable the user to customize a view based in part, on the received information. The received information may include, but is not limited to, relationship degree information, relationship category information, relationship rating information, membership information associated with a category, device information, presence information, profile information, activity information, and the like.

SNS 108 may further employ the received information to enable the user to customize a view associated with a social network perspective, based in part on a degree of relationship, relationship categorization, relationship rating, and/or other criteria. By sharing varying quantities of personal information with other social network users, the user may put forth different online profiles, public personas, and the like. The user may also determine how information about the user will be displayed to other users. The received criteria employed to enable customization of the views may include, but is not limited to, degrees of separation, category of relationship (such as friend, family, colleague, and the like), as well as any assessment of closeness, trust, an offline group affiliation, an online group affiliation, and the like. SNS 108 enables the user to preview the view resulting from applying the received criteria.

SNS 108 may also enable another social network user, such as a user of one of client devices 102-104, to view the customized view based on the received criteria. SNS 108 may employ a web service, email service, and the like, to make the customized view available to the other social network user, as appropriate. SNS 108 may employ processes such as described in more detail below to manage the customized views, and enable another social network user to view content even if the other user is not an authenticated user of SNS 108. SNS 108 may be implemented on one or more computing devices, such as a server described with regard to FIG. 2.

Illustrative Server Environment

Figure 2:
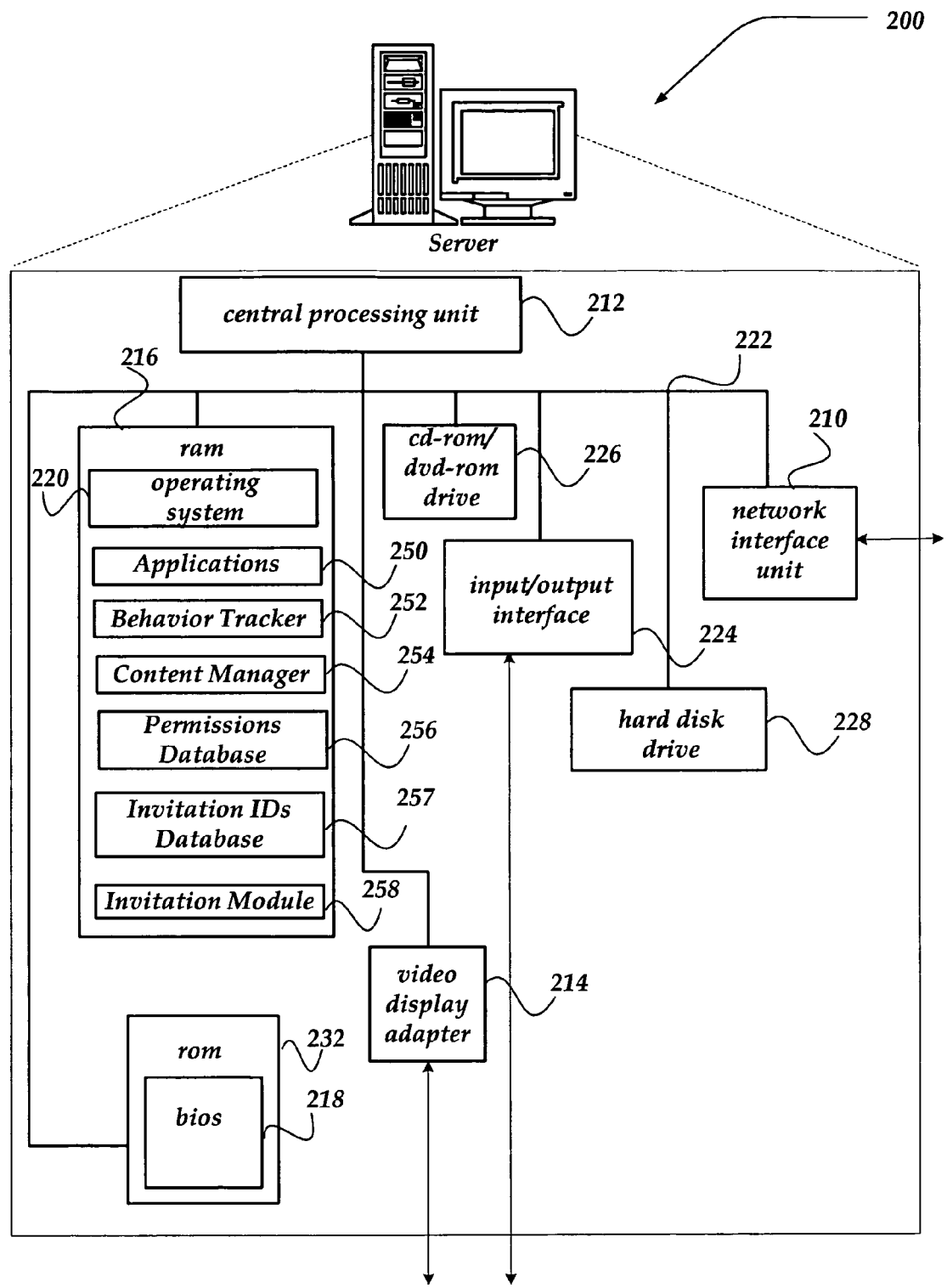
FIG. 2 shows one embodiment of a server device that may be included in a system implementing the invention.

FIG. 2 shows one embodiment of a server, according to one embodiment of the invention. Server 200 may include many more components than those shown. The components shown, however, are sufficient to disclose an illustrative embodiment for practicing the invention.

Server 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 200. As illustrated in FIG. 2, server 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

The mass memory as described above illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may also include applications such as a behavior tracker 252, which may track a user's online activities with the user's permission. Behavior tracker 252 may track the user's portal service behaviors (e.g., web searches, online purchases, etc.), the user's social network service behaviors (e.g., frequency of inviting others to join, participation in particular social network activities, etc.), and/or other behaviors.

Mass storage may further include modules that are useful for managing a user's social network, such as a content manager 254, a permissions database 256, an invitation IDs database 257, and an invitation module 258. Content manager 254 may include a database, text, folder, file, and the like, that is configured to maintain and store information that the user's wishes to use and/or share with a social network. Content may include the user's profile information, online journals (e.g., blogs), reviews of products and/or services, photographs, and the like. The content may be entered by the user or obtained from other sources. The content may be used only with the social network or with other services, such as the portal service. The content, and modules to control the content, may be centralized or distributed over a number of resources.

Permissions database 256 may be included with content manager 254 or provided as a separate entity. Permissions database 256 may enable the user to establish and store content access permission based on user relationships, types of content, and the like. User relationships may include relationship degrees (e.g., $1^{st}$, $2^{nd}$, $3^{rd}$, etc.), user-definable relationship categories (e.g., family, co-workers, fishing buddies, etc.), relationship ratings (e.g., closest, close, connected, acquainted, haven't met, etc.), and/or other forms of relationships.

Invitation IDs database 257 may be included with permissions database 256 or provided as a separate entity. Invitation IDs database 257 generally stores identifiers and other information regarding invitations from existing social network users to other users, inviting the other users to establish a social network connection with the existing social network users. An invitation module 258 manages the invitations and coordinates authentication of users and/or tokens that may be used as a means of authentication. The tokens can take any form, and are described below in the form of a URL that identifies an invitation from an authenticated inviter. The URL provides an invitee with access to content, although the invitee may not be an authenticated user.

Server 200 also includes input/output interface 224 for communicating with external devices, such as a mouse, keyboard, scanner, or other input devices not shown in FIG. 2. Likewise, server 200 may further include additional mass storage facilities such as CD-ROM/DVD-ROM drive 226 and hard disk drive 228. Hard disk drive 228 is utilized by server 200 to store, among other things, application programs, databases, content manager 254, permissions database 256, invitation IDs database 257, invitation module 258, and the like.

Illustrative Client User Interface

Figure 3:
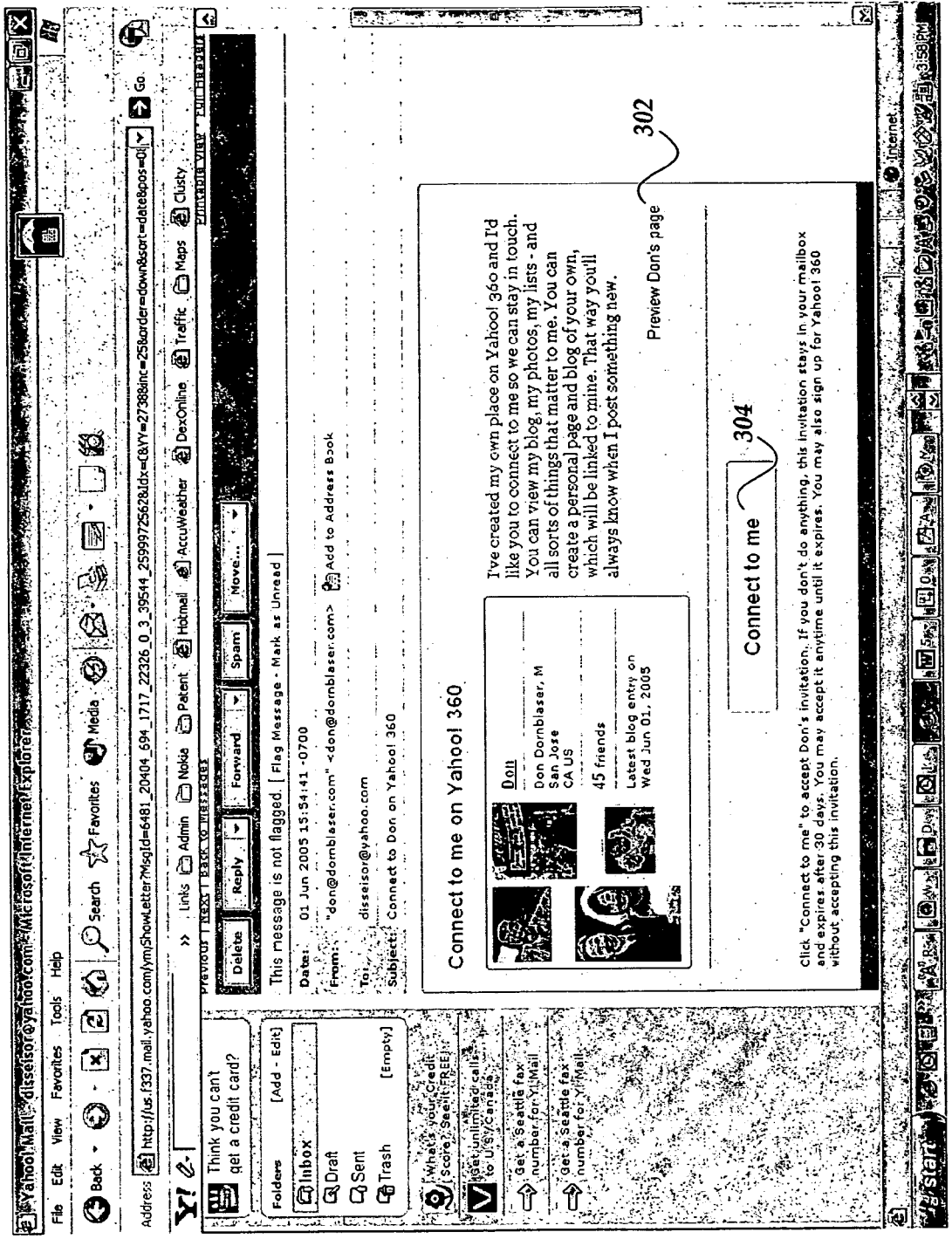
FIG. 3 shows a screen shot of a client user interface, illustrating a sample email invitation message received by an invitee.

A user interface and operation of certain aspects of an embodiment of the present invention will now be described with respect to FIGS. 3-4. FIG. 3 shows a screen shot of a client user interface 300, illustrating a sample email invitation message received by an invitee, who is not necessarily an authenticated user of an online service with which an authenticated inviter is registered. The invitation message may include some information about the inviter, such as one or more images, profile information, message text, and the like. The invitation message further includes a preview link 302 that enables the invitee to access other content without necessarily being an authenticated user of the online service. The invitee may preview the content to determine more about the invitee and/or the online service. The invitation message also includes a connection link 304 that enables the invitee to become an authenticated user of the online service and establish a connection with the inviter.

Figure 4:
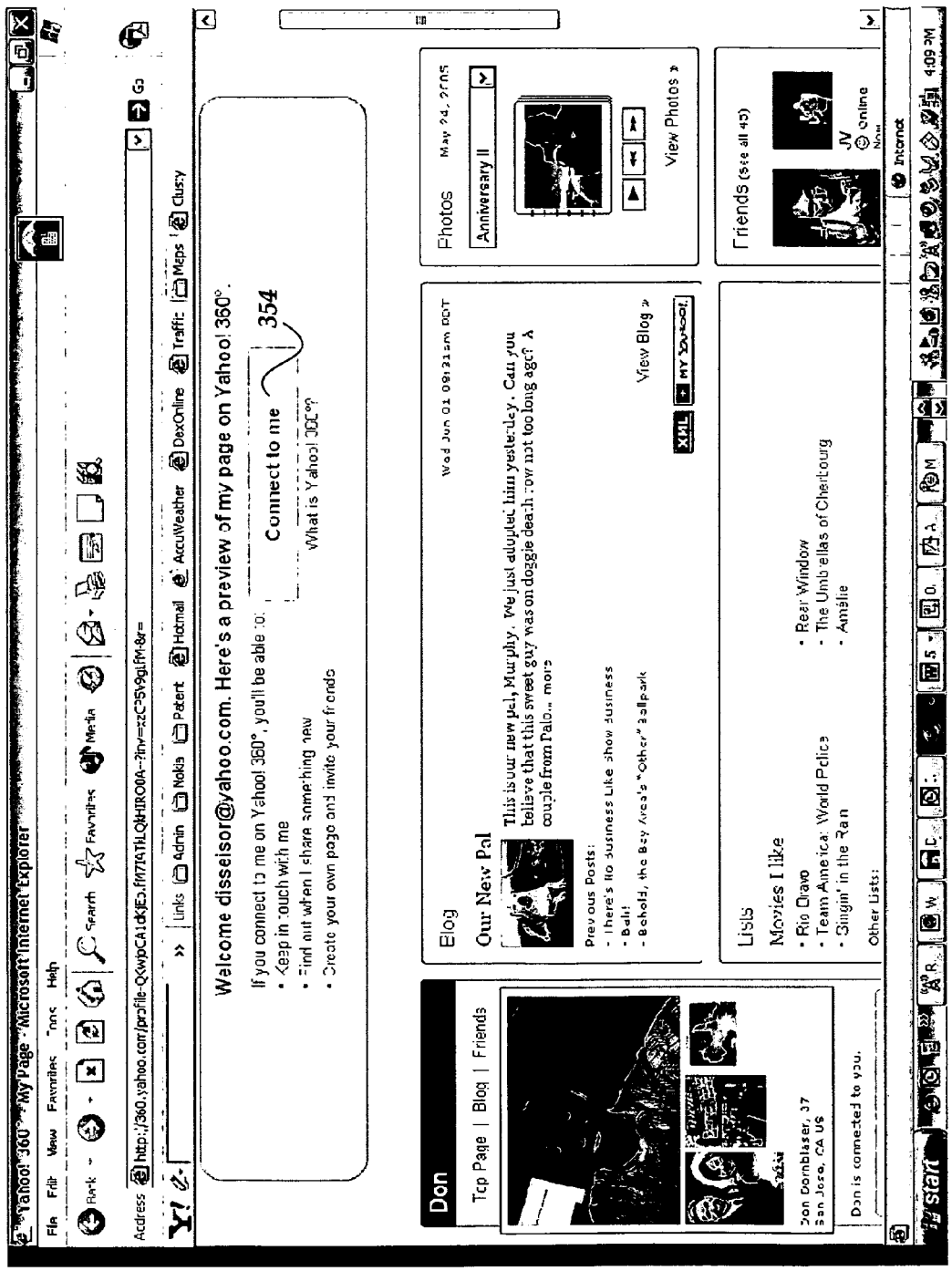
FIG. 4 shows a screen shot of a client user interface, illustrating a sample preview of content that the invitee accessed by selecting a preview link in the invitation.

FIG. 4 shows a screen shot of a client user interface 350, illustrating a sample preview of content that the invitee accessed by selecting preview link 302 of FIG. 3. The sample preview generally displays content that the invitee would see if the invitee were to register with the online service and become an authenticated user. The preview content may include more information provided by the inviter, such as blog entries, photos, lists of interests, other users associated with the inviter, product and/or service reviews submitted by the inviter, profile information about the inviter, and the like. The preview may also include a connection link 354 that enables the invitee to become an authenticated user of the online service and establish a connection with the inviter.

Illustrative Architecture and Logic

Figure 5:
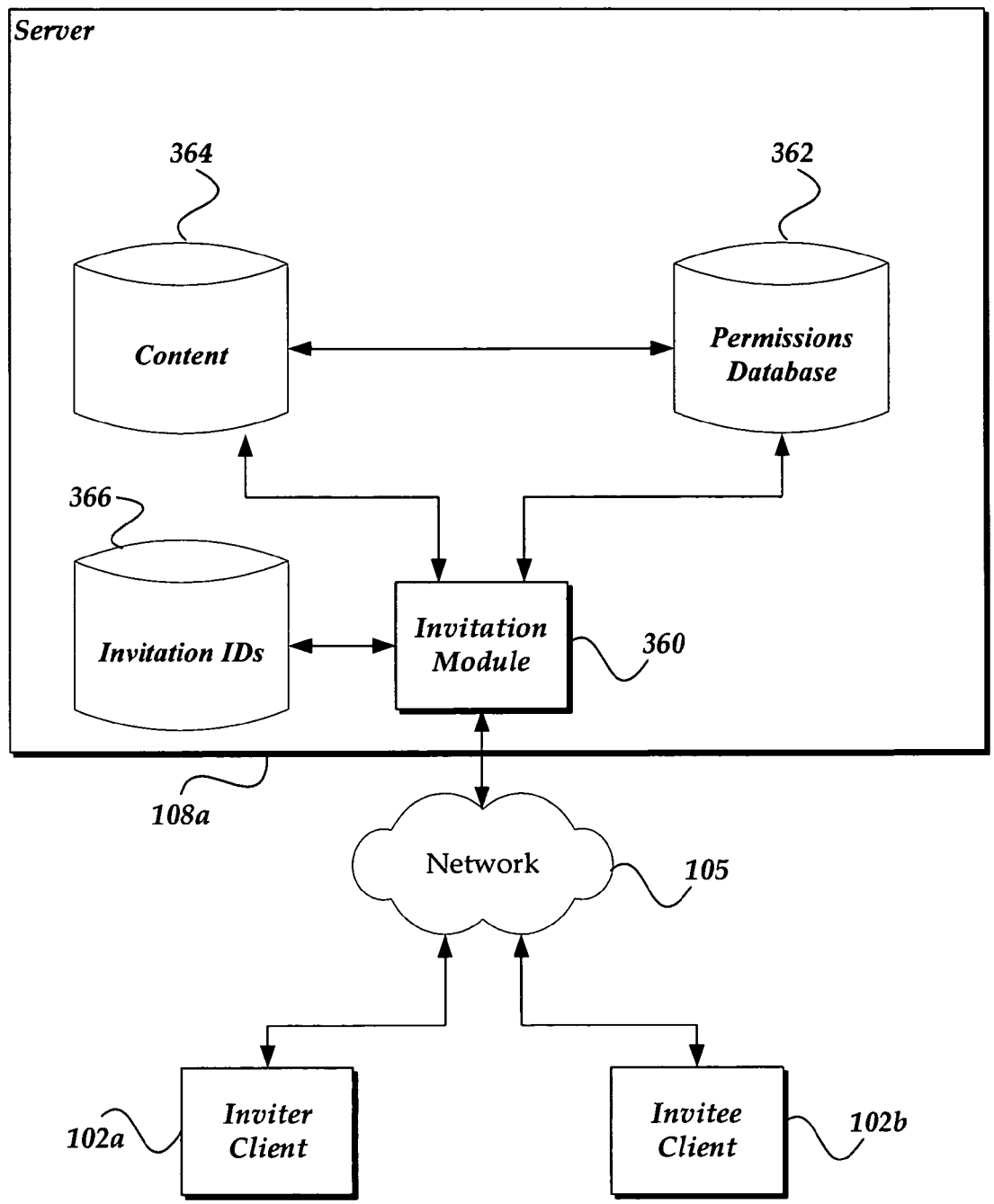
FIG. 5 illustrates an exemplary architecture that may be used to enable an inviter client to send an invitation to an invitee client.

FIG. 5 illustrates an exemplary architecture that may be used to enable an inviter client 102a to send an invitation to an invitee client 102b such that the invitation enables invitee client 102b to access content without authenticating invitee client 102b. Inviter client 102a and invitee client 102b may communicate through network 105 to a server 108a. In this sample architecture, the server includes an invitation module 360 that generally manages authentication and access to content. Invitation module 360 communicates with a permissions database 362 that may comprise an access control list or other data store. Permission database 362 generally maintains associations between user relationships and content. Registered clients, such as inviter client 102a, may assign one or more user relationships to all or portions of content, indicating which user relationship(s) are required to access each portion of content. For example, a registered client may specify that some profile information may be accessed by other users with a second degree relationship (or closer) to the registered client (e.g., a friend of a friend). The registered client may specify that other profile information may be accessed only by other users with a first degree relationship. The registered client may further specify a level of access through invitations. A default may be set, such that invitees may access content as if the invitee already had a first degree relationship with the inviter. Since the inviter is asking the invitee to establish a direct connection, the invitee may be allowed access to content as if the invitee already had a first degree relationship with the inviter. However, an embodiment may allow the registered client to control the access. For example, the registered client may specify that invitations should limit access to information that is available to other users that are within a certain category of first degree users, such as a category of co-workers. Alternatively, an embodiment may allow the registered user to specify that invitations should limit access to information that is available to other users with a second degree relationship, but not information that is available to other users with a first degree relationship to the registered user. These assignments may be stored in, or accessed by permissions database 362.

Permissions database 362 and invitation module 360 also communicate with a content data store 364, which maintains the blogs, profile information, lists, and/or other content provided by the registered client users. Optionally, content data store 364 and permissions database 362 may communicate with an intro content data store (not shown), which may store one or more subsets of content. The subsets of content may generally have the same permissions assigned as the corresponding full content. The subsets generally comprise introductory content such as the first twenty-five words of a blog entry, the first couple of items on a list, titles of review, thumb nail photos of friends, and/or other content that provides initial information about full content.

Invitation module 360 determines which content to accesses based on the user relationship associated with an invitation. The invitation module also determines an invitation ID for each invitation, and stores the invitation ID in an invitation ID database 366. The invitation ID is associated with the inviter, so that the appropriate content can be accessed when the corresponding invitee requests access to the content associated with the particular invitation. Invitation ID database 366 may store this association. The invitation ID database may also store encryption/decryption information that enables invitation module 360 to determine whether a valid request has been submitted from an invitee. By selecting the preview link, invitee client 102b submits a token (such as an encrypted URL) that may be decrypted to determine whether the request is valid and/or whether the corresponding invitation is still valid. Invitation module 360 may then assemble, format, and/or otherwise prepare the introductory content or full content, and deliver it to invitee client 102b in the invitation and/or in a preview. In another embodiment, substantially all of the introductory content and/or the full content may be delivered to invitee client 102b, which may filter the content for preview based on the user relationship selected by the inviter client 102a and associated with the invitation.

Figure 6:
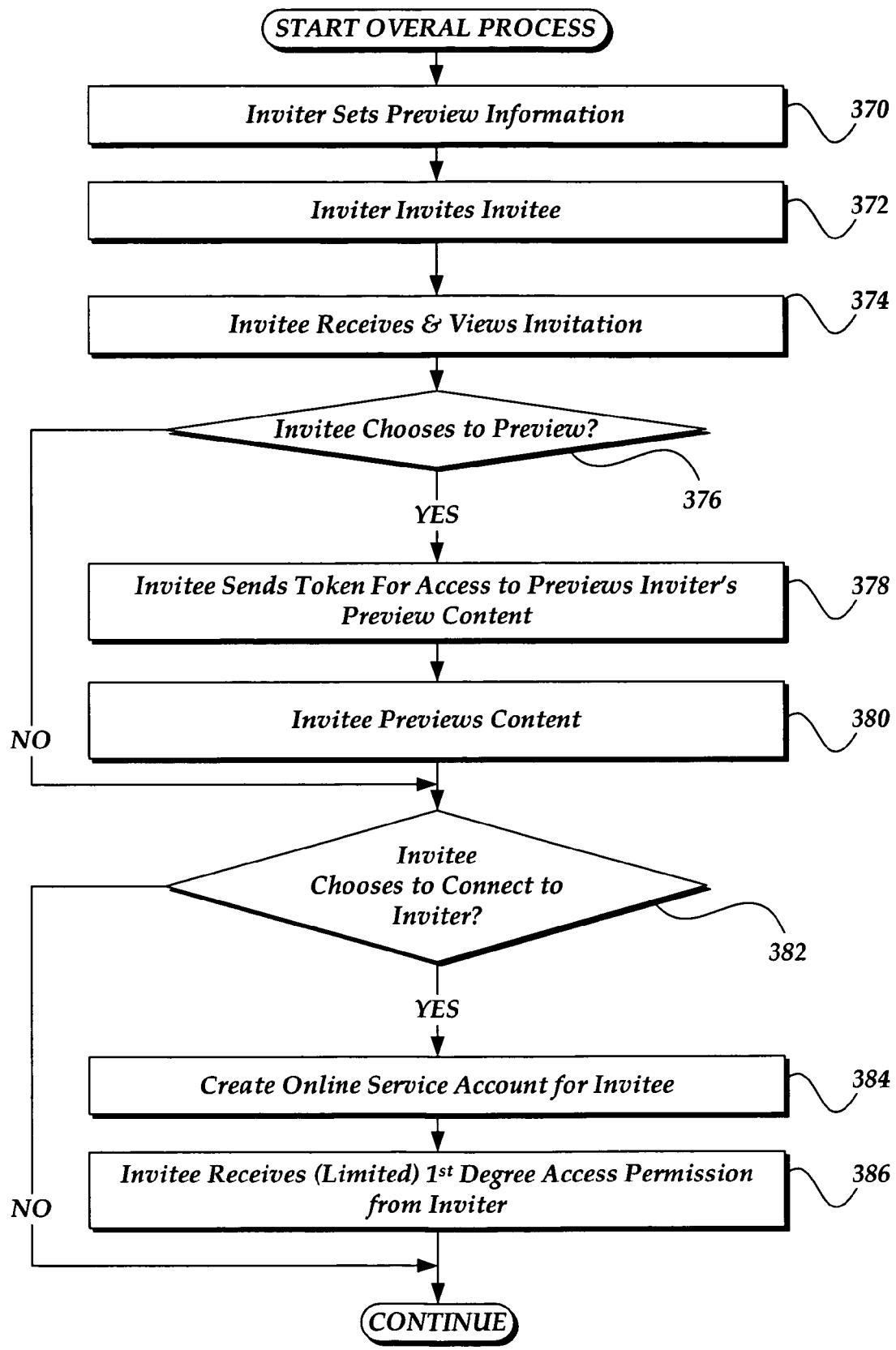
FIG. 6 is a flow diagram illustrating exemplary logic of an exemplary overall process of actions by the inviter client and invitee client that enables the invitee client to access content.

FIG. 6 is a flow diagram illustrating exemplary logic of an exemplary overall process of actions by the inviter client and invitee client that enables the invitee client to access content even though the invitee client is not necessarily authenticated. At an operation 370, the inviter sets preview information, such as specifying degrees of relationships required to access certain content. The inviter may also set a level of access to be associated with invitations. At an operation 372, the inviter identifies an invitee (e.g., specifies an email address), and sends a request to the server to send an invitation to the invitee. The server generates an invitation ID and a token for accessing the appropriate content associated with the inviter. The server then generates and sends the invitation, which is received and viewed by the invitee at an operation 374. If the invitee chooses to preview the content, at a decision operation 376, the invitee selects the preview link. This causes the token to be sent to the server, at an operation 378, which enables access to the preview content. If the token is valid, the server sends the preview content to the invitee to view at an operation 380.

If the invitee chooses to connect to the inviter, at a decision operation 382, the invitee selects the connection link. This indicates that the invitee accepts the invitation to register with the server. At an operation 384, the server creates an online service account for the invitee, or otherwise registers the invitee with the online service. The invitee is then an authenticated user. The invitee generally receives permission to access the inviter's content with a first degree user relationship level, at an operation 386. However, the relationship may be limited to a particular category or further limited by the inviter.

Figure 7:
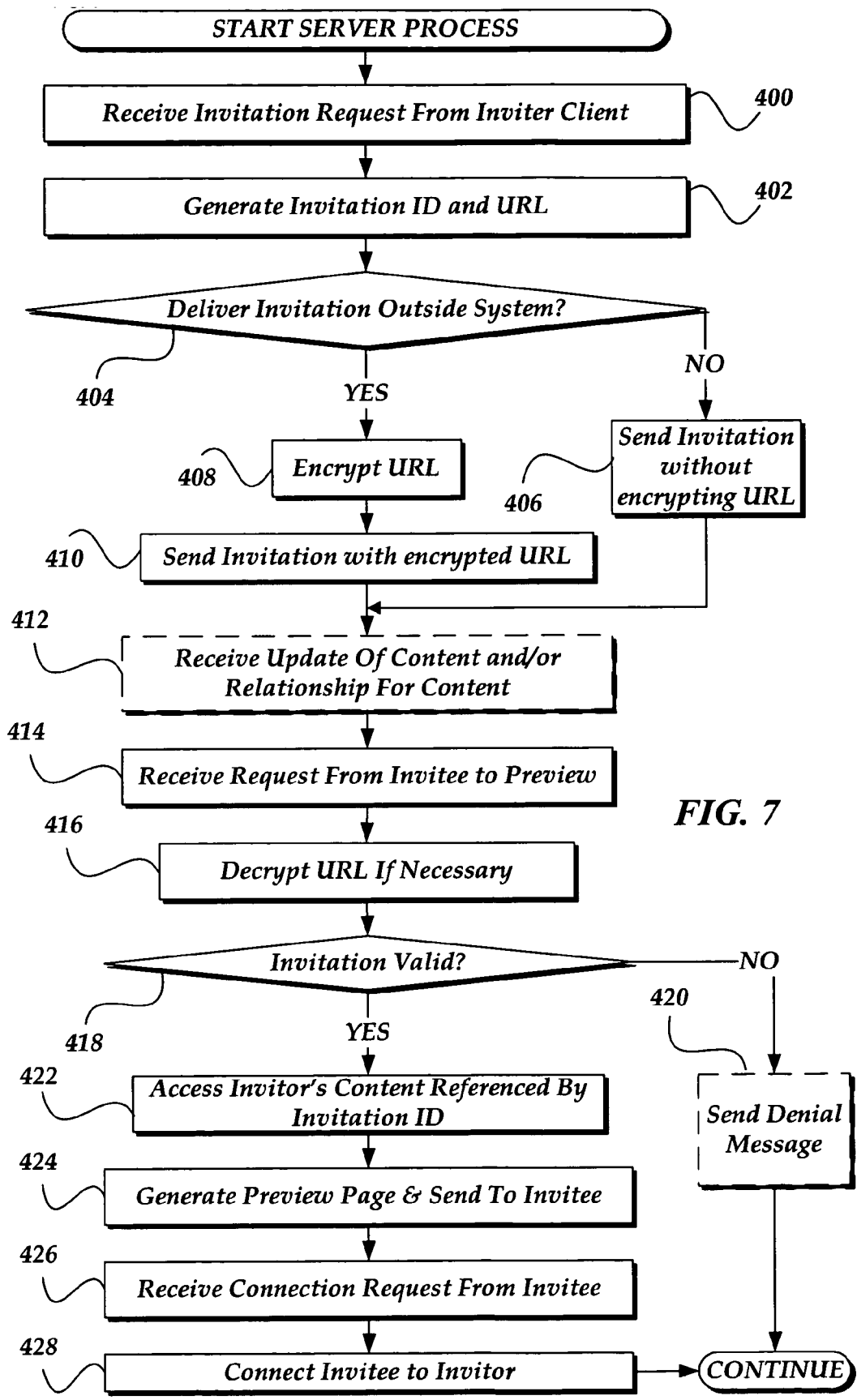
FIG. 7 is a flow diagram illustrating exemplary logic of a server process for enabling access to content by an unauthenticated user.

FIG. 7 is a flow diagram illustrating exemplary logic of a server process for enabling access to content by an unauthenticated user. At an operation 400, the server receives a request from an inviter client to send an invitation to an invitee. The request generally includes the invitee's address. The request also may include a user relationship, such as a relationship category, so that the server can determine which content will be accessible to the invitee. A default user relationship may be used for all invitations as an alternative to including the user relationship in the request.

At an operation 402, the server generates an invitation ID and a URL to be included in the invitation. The invitation ID uniquely identifies the invitation so that the invitation is associated with the inviter, the invitee, the user relationship used for the invitation, the content that should be accessible to the invitee, an invitation expiration date, and/or other information. The invitation ID, or a coded version of the invitation ID, is included into the URL, which acts as a token within the invitation that enables the invitee to access the content via the server. At a decision operation 404, the server determines whether the invitation is to be sent to an invitee address that is outside an online service network in which the server operates. The server may also use an internal and/or external system to check a current presence of the invitee, to determine if the message will be routed outside the online service network, even if the invitee address is within the online service network. For example, the invitee may have an email address that is within the online service network, but the invitee may have selected a presence setting, requiring that all messages be forwarded to a mobile phone as SMS messages. If the invitation should be routed within the online service network, the server inserts the URL into an invitation message at an operation 406, without encrypting the URL. The server may also access some content associated with the inviter and add it to the invitation, such as images, text, and/or other information associated with the inviter. The invitation is then sent to the invitee within the online service network, which is considered secure. However, if the invitee address is outside the online service network, or the presence information indicates that the invitation will be routed outside the online service network, the server encrypts the URL at an operation 408. The encryption may be performed with any of a number of techniques, including, but not limited to, public/private keys, secure hash algorithms, and the like. The encrypted URL is inserted into an invitation message along with content associated with the inviter. The invitation with the encrypted URL is then sent to the invitee at an operation 410.

At an optional operation 412, the content and/or user relationship(s) may be updated while an invitation is outstanding. For example, the inviter may change assignments of relationship categories to content. There is no need to change the invitation. Rather, the URL will simply refer to the most current content and associations between content and user relationships. At an operation 414, the server may receive a request to preview the content. The request generally comes from the invitee, although the request may come from another user to which the invitation was forwarded by the invitee. Alternatively, the request may come from the invitee, but from a device or communication account to which the invitee currently wants messages forwarded. The request results from the invitee or other user selecting the preview link in the invitation. The requesting client (e.g., the invitee client) would then send the request with the URL. For example, the invitee client may send the URL in a hypertext transfer protocol (HTTP) post message. If the URL is encrypted, the server decrypts the URL at an operation 416.

At a decision operation 418, the server determines whether the invitation is valid based on the (decrypted) URL. The server obtains the invitation ID from the URL, and ensures that the invitation ID exists in the invitation IDs database. If the invitation ID is in the invitation IDs database, the server checks the information associated with the invitation ID. For example, if the invitation ID from the received URL is associated with an inviter who is no longer registered with the online service, the server may deny the invitee's request to preview the content and/or redirect the request to a preview of other sample content. Similarly, if the URL indicates a relationship category that no longer exists, the server may deny the invitee's request and/or redirect the request. The server may also determine whether the invitation has expired, and/or another problem exists. If a problem occurs, the server may optionally send a denial message at an operation 420, and/or take other action.

If the invitee's request is determined to be valid, the server accesses the content associated with the invitation ID, at an operation 422. The invitation ID is associated with the inviter, so the server generally accesses content provided by the inviter. The content is used to generate a preview document, such as a preview web page, and the preview document is sent to the invitee at an operation 424. If the invitee selects the connection link in the displayed preview document or in the invitation, a connection request is sent from the invitee client and received by the server at an operation 426. The connection request may also be in the form of an HTTP post message that includes the invitation ID, which identifies the inviter. At an operation 428, the server registers the invitee and establishes a connection between the invitee and the inviter. The connection may use the same user relationship as the invitation or a different user relationship specified by the inviter for users that choose to connect to the inviter.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
    associating, via a computing device, electronic content with an authenticated user of an electronic service;
    associating, via the computing device, the content with a user relationship in a computerized online social network that indicates at least one form of the user relationship based on a degree of separation involving a direct or indirect relationship between at least one unauthenticated user and the authenticated user, the online social network being a computerized service for communicating information over a network to and from users of the online social network, wherein the user relationship is established and controlled by the authenticated user, said at least one form of the user relationship is required to exist in the online social network before access to at least a portion of the content is provided to any unauthenticated user;
    associating, via the computing device, the content with a token;
    providing, via the computing device, the unauthenticated user with an invitation to join the online social network and establish the user relationship between the unauthenticated user and authenticated user in order for the unauthenticated user to access the content, said invitation comprising the token;
    receiving, via the computing device, the token as a request by the unauthenticated user to join the online social network and access the content, wherein said accessing the content comprises at least previewing a sample of the content;
    determining, via the computing device, whether the token is valid; and
    establishing, via the computing device, the user relationship between the authenticated and unauthenticated user if the token is valid, said establishing comprising enabling, via the computing device, access for the unauthenticated user to at least a portion of the content associated with the token, wherein access to the content is filtered for the unauthenticated user based on a determination that the at least one form of the user relationship exists in the online social network between the authenticated user and the unauthenticated user.

2. The method of claim 1, wherein the content comprises a subset of data associated with the authenticated user, and wherein another subset of data is associated with a different user relationship.

3. The method of claim 1, wherein the user relationship comprises at least one of the following:
    the degree of relationship with the authenticated user that is required to access the content;
    a category of relationship with the authenticated user that is required to access the content; and
    a rating of the relationship with the authenticated user that is required to access the content.

4. The method of claim 1, wherein the token comprises a universal resource locator (URL).

5. The method of claim 1, further comprising:
    encrypting the token prior to providing the token to the unauthenticated user; and
    decrypting the token upon receiving the token.

6. The method of claim 1, wherein the token is provided to the unauthenticated user an invitation to participate in the electronic service.

7. The method of claim 1, wherein determining whether the token is valid comprises at least one of the following:
    determining that an expiration period associated with the token has not elapsed;
    determining that the authenticated user associated with the token is still an authenticated user of the electronic service; and
    determining that the token includes an identifier that is stored by the electronic service.

8. The method of claim 1, further comprising modifying the content prior to enabling access to the content, such that access is enabled to the modified content if the token is valid.

9. The method of claim 1, further comprising:
    receiving a request from the unauthenticated user to establish a user relationship connection between the unauthenticated user and the authenticated user, wherein the request includes the token; and
    establishing the user relationship connection between the unauthenticated user and the authenticated user within the electronic service.

10. A computer readable non-transitory storage medium, comprising executable instructions for performing actions of claim 1.

11. A server comprising:
    a communication interface in communication with an authenticated client device and an unauthenticated client device;
    a memory for storing instructions; and
    a processor in communication with the communication interface and with the memory, wherein the processor performs actions based at least in part on the stored instructions comprising:

associating electronic content of an electronic service with the authenticated client;

associating the content with a user relationship in a computerized online social network, the online social network being a computerized service for communicating information over a network to and from users of the online social network, the user relationship indicates at least one form of the user relationship based on a degree of separation involving a direct or indirect relationship between at least one unauthenticated user and the authenticated user, wherein the user relationship is established and controlled by the authenticated user, the at least one form of the user relationship is required to exist in the online social network before access to at least a portion of the content is provided to any unauthenticated user;

associating the content with a token;

providing the unauthenticated user with an invitation to join the online social network and establish the user relationship between the unauthenticated user and authenticated user in order for the unauthenticated user to access the content, said invitation comprising the token;

receiving the token from the unauthenticated client device as a request to join the online social network and access the content, said accessing the content comprising at least previewing a sample of the content;

determining whether the token is valid; and establishing the user relationship between the authenticated and unauthenticated user if the token is valid, said establishing comprising enabling access for the unauthenticated user to at least a portion of the content associated with the token, wherein access to the content is filtered for the unauthenticated user based on a determination that the at least one form of the user relationship exists in the online social network between the authenticated user and the unauthenticated user.

12. The server of claim 11, wherein the user relationship comprises at least one of the following:

the degree of relationship with the authenticated client that is required to access the content;

a category of relationship with the authenticated client that is required to access the content; and a rating of the relationship with the authenticated client that is required to access the content.

13. The server of claim 11, wherein the token comprises a universal resource locator (URL).

14. The server of claim 11, wherein the processor actions further include:

determining whether the unauthenticated client is in secure communication with the server;

encrypting the token prior to sending the token to the unauthenticated client if the unauthenticated client is not in secure communication with the server; and decrypting the token upon receiving the token from the unauthenticated client if the unauthenticated client is not in secure communication with the server.

15. A method comprising:

receiving, at a computing device, a token that is associated with electronic content, wherein the content is also associated with an authenticated user of an electronic service and the content is further associated with a user relationship in a computerized online social network, the online social network being a computerized service for communicating information over a network to and from users of the online social network, the user relationship indicates at least one form of the user relationship based on a degree of separation involving a direct or indirect relationship between at least one unauthenticated user and the authenticated user, wherein the user relationship is established and controlled by the authenticated user, the at least one form of the user relationship is required to exist in the online social network before access to at least a portion of the content is provided to any unauthenticated user;

communicating, via the computing device, the token to the electronic service that determines whether the token is valid, wherein the token is received from an unauthenticated client as a request to establish the user relationship between the unauthenticated user and the authenticated user in order to access the content; and receiving, at the computing device, access for the unauthenticated user to at least a portion of the content if the token is valid, said access comprising at least an ability to preview a sample of the content, wherein access to the content is filtered for the unauthenticated user based on a determination that the at least one form of the user relationship in the online social network exists between the authenticated user and the unauthenticated user.

16. The method of claim 15, further comprising displaying the token as a URL link such that a user selection of the URL link causes the token to be communicated to the electronic service.

17. The method of claim 15, wherein the method is executed by a mobile terminal.

* * * * *